United States Patent [19]

Truchard et al.

[11] Patent Number: 5,313,622

[45] Date of Patent: May 17, 1994

[54] TIMING APPARATUS AND METHOD FOR GENERATING INSTRUCTION SIGNALS

[75] Inventors: James J. Truchard; Audrey F. Harvey, both of Austin, Tex.

[73] Assignee: National Instruments, Austin, Tex.

[21] Appl. No.: 87,965

[22] Filed: Jul. 6, 1993

Related U.S. Application Data

[63] Continuation of Ser. No. 568,480, Aug. 16, 1990, abandoned.

[51] Int. Cl.$^5$ .......................... G06F 7/00; G06F 7/62; G06F 9/00; G06F 12/00
[52] U.S. Cl. .................... 395/550; 395/375; 395/800; 395/425; 364/250; 364/251.3; 364/254.5; 364/262.4; 364/270; 364/270.6; 364/262; 364/DIG. 1
[58] Field of Search ............... 395/550, 800, 375, 425; 388/907.5, 912; 365/189.01, 221, 230.01, 233, 236; 364/140, 143, 166

[56] References Cited

U.S. PATENT DOCUMENTS

| | | | |
|---|---|---|---|
| 4,101,761 | 7/1978 | Merryman | 235/92 CA |
| 4,279,015 | 7/1981 | Edelman et al. | 395/550 |
| 4,321,687 | 3/1982 | Parsons et al. | 395/550 |
| 4,654,817 | 3/1987 | Dube et al. | 39/375 |
| 4,905,183 | 2/1990 | Kawaguchi et al. | 395/800 |
| 5,021,990 | 6/1991 | Tachibana | 395/550 |
| 5,040,234 | 8/1991 | Yamamoto et al. | 388/811 |
| 5,134,562 | 7/1992 | Hattori et al. | 395/400 |

OTHER PUBLICATIONS

TMS320C14/TMS320E14 User's Guide, produced by Texas Instruments, Inc., 1988.
MC68332 User's Manual, Section 8 TPU Overview, produced by Motorola, 1989.
Product Catalog, Southworth Music Systems, Inc., 1988.
"Low-cost timing analyzer simplifies trigger setup", EDN, p. 200, Redde & Schwarz Inc., Jul., 1988.
Application Notes, 6.4 ∝ MIPS DSP based microcontroller invades control applications, by Microchip Technology Inc., 1988.
Dan Staussberg, "PC based logic analyzers", EDN, pp. 134-148, Oct., 1988.
DSC32014 Digital Signal Controller, (labeled preliminaary) by Microchip, 1988.
TMS370 Programmable Acquisition and control timer, chapter 12, by Texas Instruments, Feb. 1990.

Primary Examiner—Alyssa H. Bowler
Assistant Examiner—Alpesh M. Shah
Attorney, Agent, or Firm—Flehr, Hohbach, Test, Albritton & Herbert

[57] ABSTRACT

An apparatus is provided for use in conjunction with a control system which can provide one or more respective output instructions and one or more corresponding respective timing instructions, the apparatus comprising a counter for providing a count sequence for substantially continuously providing a measure of elapsed time within a prescribed time interval; a storage device, responsive to a match indication, for storing multiple respective output instructions and corresponding multiple respective timing instructions and for asserting respective output instructions and corresponding respective timing instructions in order of a sequence such that upon receipt of a match indication, a next respective output instruction and a corresponding next respective timing instruction in the sequence are asserted; and a comparator for comparing each respective asserted timing instruction to the count of the count sequence and for providing the match indication upon an occurrence of a match.

11 Claims, 10 Drawing Sheets

TIMING APPARATUS AND METHOD FOR GENERATING INSTRUCTION SIGNALS

This is a continuation of application Ser. No. 07/568,480 filed Aug. 16, 1990, now abandoned.

BACKGROUND OF THE INVENTION

1. Field of the Invention

The invention relates generally to timing systems and more particularly to signal pattern generation systems for generating a series of multiple signal patterns and to event recording systems for recording the time at which digital trigger signals are asserted by an external system.

2. Description of the Related Art

Processor based control systems are well known which produce digital output signal patterns used to control external systems such as test and measurement equipment. Frequently, individual digital output signals must be asserted at different times. Consequently, in the past there have been timing systems for ascertaining the different times at which different digital output signals are to be asserted. Typically, such timing systems included mechanisms to continuously provide a measure of elapsed time and typically, such timing systems included mechanisms to continuously provide a measure of elapsed time and mechanisms to generate individual digital output signals at appropriate times.

Processor-based monitoring systems also are well known for monitoring the assertion of one or more digital trigger signals by an external system. The external system, for example, may assert different digital trigger signals to indicate the occurrence of different events such as, the beginning or end of measurements of a device under test or a time interval during which data is taken. Since the time at which events occur relative to the occurrence of other events often is of interest, such prior timing systems frequently included mechanisms to substantially continuously provide a measure of elapsed time and mechanisms to record the times at which different trigger signals are asserted by the external system.

While earlier timing systems for use in conjunction with control and/or monitoring systems generally have been acceptable, there have been shortcomings with their use. For example, the time at which a trigger signal is asserted may depend upon the time at which a digital output signal was asserted, and the measure of delay between the two signals may be of interest. More specifically, for example, an output signal may cause the external system to provide a stimulus to a device under test, and the external system may assert the trigger signal when the response of the device to the stimulus reaches a prescribed threshold. The delay between the stimulus-provoking output signal and the responsive trigger signal may represent a measure of the response time of the device under test to the stimulus. Unfortunately, a lack of synchronization between the mechanisms used to provide a measure of elapsed time in timing systems used to produce output signals and corresponding mechanisms used in timing systems used to record assertions of trigger signals can lead to inaccuracies in measurement of such response time. Thus, there has been a need for close synchronization of the mechanisms used in timing systems to provide measurements of elapsed time for use by control systems and monitoring systems. The present invention meets this need.

Furthermore, earlier timing systems used in conjunction with control systems often have included relatively extensive circuitry to ascertain the time when individual digital output signals in a multiple signal pattern are to be asserted. For example, there have been timing systems in which a separate multiple bit register and a corresponding separate multiple bit comparator is employed for each output terminal on which a digital output signal can be asserted. In operation, for each output terminal, a register stores a multiple bit binary value that represents the clock value at the time when a digital output signal is to be generated. Moreover, for each such output terminal, a corresponding comparator compares the multiple bit binary value stored in the corresponding register with a clock count. When a match between register value and clock count occurs, a processor within the control system is interrupted so that it can generate an appropriate digital output signal on the output terminal.

Unfortunately, the implementation of such multiple comparators and multiple registers involves the use of a significant amount of circuitry. Additionally, the use of interrupts to involve the processor in the generation of digital output signals each time a match occurs on any one of multiple output terminals often can result in inefficient use of processor time. Thus, there has been a need for a timing system that permits the use of fewer comparators and fewer registers and which permits more efficient use of processor time. The present invention also meets these needs.

SUMMARY OF THE INVENTION

The present invention provides a novel timing system for generating output signal patterns in response to output/timing instructions provided by a control system. The timing system includes a digital counter for providing a count sequence for providing a measure of elapsed time. A storage device stores multiple output instructions and corresponding multiple timing instructions. The storage device outputs the respective output instructions and the corresponding timing instructions in order of a sequence such that, upon an occurrence of a match indication, a next respective output instruction and a corresponding next respective timing instruction in the sequence are asserted. A comparator compares each respective timing instruction asserted by the storage device to the count of the count sequence and produces a match indication upon an occurrence of a match.

Thus, the timing system of the present invention advantageously can generate numerous multiple output signal patterns without unduly complex circuitry and without undue control system processor intervention.

In another aspect, the present invention provides a new timing system for generating output signal patterns in response to output/timing instructions provided by a control system and for detecting and recording trigger signals asserted by an external system. The timing system includes a timing device for providing a measure of elapsed time. An event detecting and recording device detects respective assertions of one or more trigger signals and produces respective records of such assertions. Each record includes a time-stamp derived from a measure of elapsed time produced by the timing device upon the detection of an asserted trigger signal. A pattern generation device generates respective output signal patterns in response to respective output instructions at respective output times dictated by the respective timing instructions. The pattern generation device ascertains the arrival of the respective output times from the measure of elapsed time produced by the timing device.

Therefore, both the event detection and recording device and the pattern generation device are responsive to the timing device. Consequently, there is close synchronization between the operation of these two systems.

These and other features and advantages of the present invention will become apparent from the following description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which.

DETAILED DESCRIPTION OF THE PREFERRED EMBODIMENT

The present invention comprises a novel timing system and an associated method. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
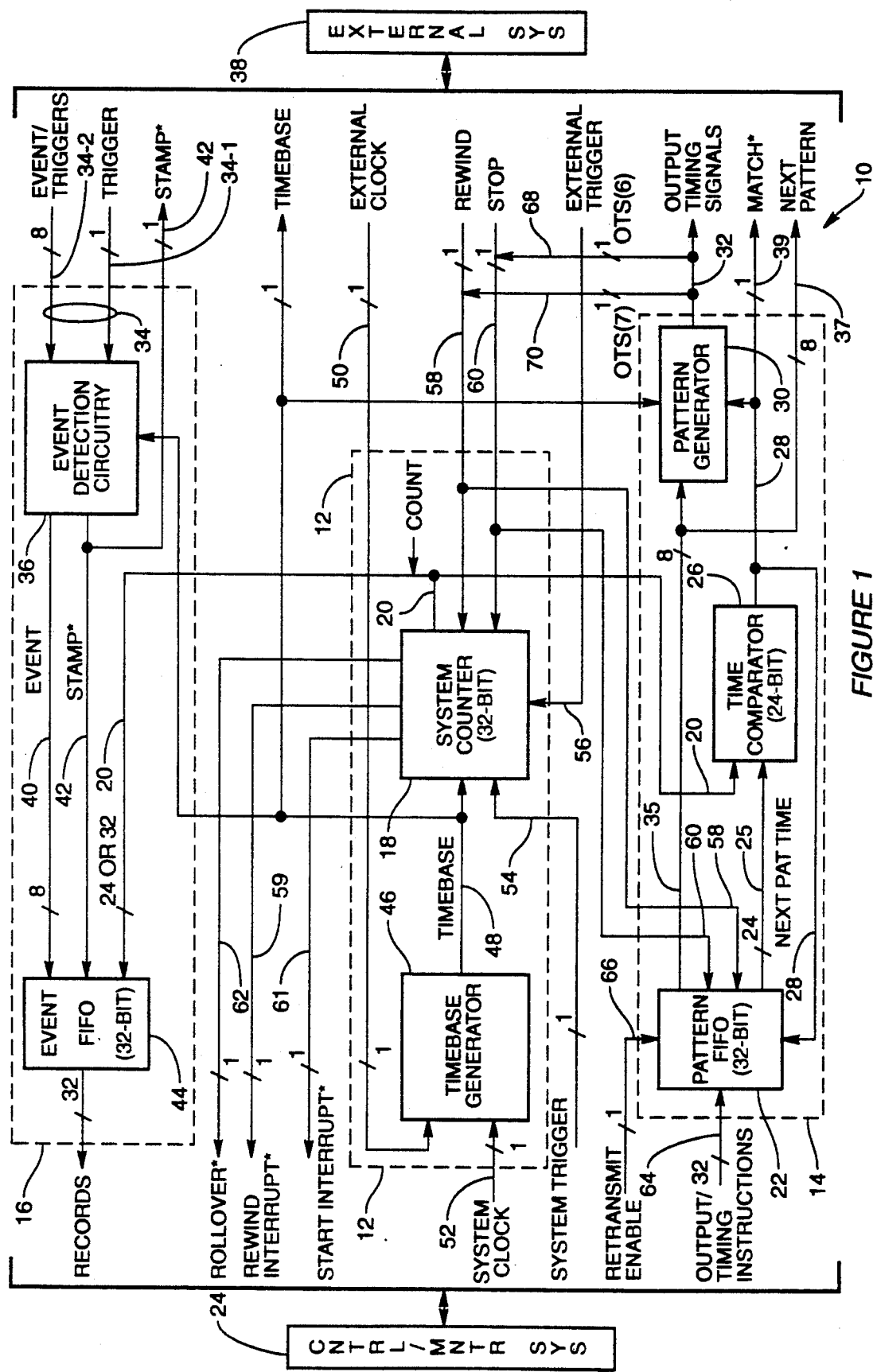
FIG. 1 is an illustrative block diagram of a timing system in accordance with a presently preferred embodiment of the invention.

FIG. 1 is a block diagram of a timing system 10 in accordance with the invention. The timing system 10 includes a clock unit 12, a pattern generation unit 14, and a detection and recording unit 16. The clock unit 12 includes a 24/32-Bit counter 18 that produces on lines 20 a clock count that provides a substantially continuous indication of elapsed time during a time interval circumscribed by a clock count of (0) and a clock count of either ($2^{24}$) or ($2^{32}$).

The clock unit 12 is a mechanism for providing a measurement of elapsed time. As will be explained more fully below, the clock count on lines 20 is shared by the pattern generation unit 14 and the detection and recording unit 16. Consequently, there is close synchronization of the operations of the pattern generation unit and the detection and recording unit.

The pattern generation unit 14 includes a First-In-First-Out (FIFO) memory 22 for storing a sequence of output instructions and a sequence of corresponding timing instructions provided by a control/monitoring system 24, which forms no part of the present invention and need not be described in detail herein. A comparator 26 compares respective stored timing instructions provided on lines 25 with the count sequence provided on clock count lines 20. Upon an occurrence of a match between a respective timing instruction and the count, the comparator 26 produces on lines 28 a match indication signal. In response to the match indication signal, a pattern generator 30 generates a multiple output signal pattern on lines 32. The pattern generator 30 generates the pattern in response to a respective stored output instruction provided on lines 35 that corresponds to the timing instruction on lines 25 for which a match was detected.

Furthermore, in response to the match indication signal, the FIFO memory 22 provides on lines 25 a next respective timing instruction in the stored sequence and provides on lines 35 a corresponding next respective output instruction in the stored sequence. The comparator 26 compares the next respective timing instruction in the sequence with successive counts of the count sequence, and the procedure described above repeats.

The detection and recording unit 16 includes event detection circuitry 36 for detecting the assertion of digital trigger signals on lines 34 by an external system 38, which forms no part of the present invention and need not be described in detail herein. The detection circuitry 36 provides the asserted trigger signals on lines 40. Upon detection of an assertion of one or more digital trigger signals, the detection circuitry also provides on line 42 an event indication signal, or stamp signal, which causes an event FIFO 44 to store a record of the detected trigger signals. The record can include either the state(s) of the asserted event trigger signal(s) 34-2 or an indication of an assertion of the trigger signal 34-1. The record also includes the clock count at the time when the asserted signals were detected. The counter 18 provides the count sequence to the event FIFO 44 via the clock count lines 20. In response to the provision of the event indication signal on line 42, the event FIFO 44 stores a time-stamp comprising the count upon receipt of the event indication signal as well as the state(s) of the one or more detected trigger signals on lines 40.

Therefore, the presently preferred embodiment provides a clock unit 12 that is shared by the pattern generation unit 14 and the detection and recording unit 16. Both the counts at which respective digital output signal patterns are to be generated and the counts used for time-stamping of records of the respective states of detected trigger signals are derived from the count sequence produced by counter 18. Thus, the presently preferred embodiment permits close synchronization of the operation of the pattern generation unit 14 and the operation of the detection and recording unit 16.

Furthermore, the pattern generation unit 14 advantageously stores a sequence of output and timing instructions that dictate the multiple signal patterns provided on lines 32. In the presently preferred embodiment, a single comparator 26 is used to provide the multiple signal patterns on the multiple output lines 32. Since the FIFO memory 22 stores a sequence of output instructions that dictates how the output pattern on output lines 32 is to change in response to match indication signals on line 28, a processor (not shown) of the control/ monitoring system 24 need not be interrupted to involve it in the generation of an output signal pattern when the pattern needs to be changed.

More particularly, a timebase generator 46 produces on line 48 a timebase signal that controls the rate at which the counter 18 increments. The timebase generator produces the timebase signal from either an external clock signal on line 50 or from a system clock signal on line 52. The timebase period determines the resolution of the clock unit 12. Specifically, the timebase period determines the precision with which the pattern generation unit 14 can time the generation of output signals on lines 32 and determines the accuracy with which the detection and recording unit 16 can ascertain the time when one or more trigger signals are asserted on lines 34. For example, a timebase of 10 MHz means that output signals can be generated and trigger signals can be measured to within 100 nsec.

The counter 18 increments once every timebase period. The counter provides on lines 20 a count sequence that is monitored by both the comparator 26 and the event FIFO 44. The counter 18 starts its count in response to either an assertion of a system trigger on line 54 or in response to an assertion of an external trigger on line 56. The counter 18 waits at count=0 until the system trigger or the external trigger is received. Thus, the point in time at which the system trigger or the external trigger is asserted serves as the reference point at which a counting sequence begins.

A rewind signal asserted on line 58 by the external system 38 can reset the counter 18 to count=0 and cause the counter to once again begin counting from count=0. A stop signal asserted on line 60 by the external system 38 can stop the counter 18 and reset the count to count=0. The counter asserts a rewind interrupt on line 59 whenever the system counter 18 is reset to count=0 by either a rewind signal received on line 58 or a stop signal received on line 60. It asserts a start interrupt on line 61 whenever it receives a system trigger signal on line 54 or an external trigger on line 56. One skilled in the art will appreciate the use of these interrupt signals.

The counter 18 asserts a rollover signal on line 62 whenever it rolls over from its highest count to count=0. The rollover signal can be used, for example, to generate an interrupt to a processor of the control/-monitoring system 24. The rollover signal also can be used by the control/monitoring system 24 to extend the count beyond 24 or 32 bits by keeping track of the number of rollovers.

Figure 2:
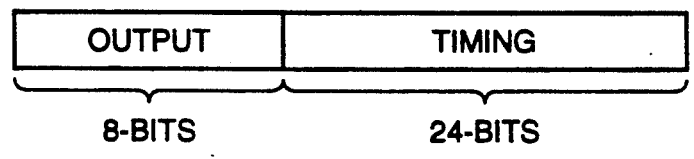
FIG. 2 is an output/timing instruction for storage by the pattern FIFO of the timing system of FIG. 1.

The pattern generation unit 14 can generate a series of multiple output signals on lines 32. That is, the unit 14 can generate a series of output patterns on lines 32. Referring to the illustrative drawing of FIG. 2, there is shown a representation of a 32-bit output/timing instruction which includes an 8-bit output instruction and a corresponding 24-bit timing instruction. In operation, a sequence of such output/timing instructions are inputted to the pattern FIFO 22 by the control/monitoring system 24 in the order in which output signal patterns dictated by corresponding output/timing instructions are to be generated on lines 32.

The pattern FIFO 22 outputs the respective 8-bit output instructions on lines 35 and outputs the respective 24-bit timing instructions on lines 25 one at a time in the order in which they were inputted into the pattern FIFO 22, i.e. in first-in-first-out order. Each output instruction in the sequence instructs the pattern generator as to how the pattern on lines 32 is to change. Each corresponding timing instruction in the sequence represents a clock count in the count sequence at which the multiple signal output pattern on lines 32 is to change.

It will be appreciated that by outputting the output/-timing instructions in the same order that they are inputted into the pattern FIFO 22, a processor of the control/monitoring system 24 need not be involved each time an output pattern changes. As explained below, comparator 26 and pattern generator 30 respond to the output/timing instructions without the need for processor intervention.

The comparator 26 compares each timing instruction outputted to lines 25 with the count sequence on lines 20. Upon detecting a match between a timing instruction and the count, the comparator 26 provides the match indication signal on line 28.

Upon the occurrence of the match indication signal, the pattern generator 30 generates a new 8-bit output pattern on lines 32 in response to the 8-bit output instruction that was asserted on lines 35 when the comparator 26 detected the match between timing instruction and count. Moreover, in response to the match indication signal, the pattern FIFO 22 outputs onto lines 35 the next 8-bit output instruction in the stored sequence and outputs onto lines 25 the corresponding next 24-bit timing instruction in the sequence.

Therefore, in response to a detection of a match, the 8-bit output pattern on lines 32 is changed in accordance with an 8-bit output instruction on lines 35 at a time dictated by the timing instruction. A next timing instruction in the sequence is asserted by the pattern FIFO 22 for comparison with the clock count. Moreover, a next 8-bit instruction in the sequence is asserted on lines 35 so as to dictate how the output pattern is to change upon a subsequent detection of a match between the next asserted timing instruction and the count of the count sequence. This series of operations occurs for each respective output/timing instruction stored in the pattern FIFO 22.

Each output instruction asserted on lines 35 is immediately available on lines 37, and an asserted match indication signal also is available on line 39. Thus, the external system 38 can "look-ahead" to predict the nature of changes in the output signals on lines 32 prior to the occurrence of such changes and can monitor the match indication signal to determine when such changes occur.

In the presently preferred embodiment, each channel of the pattern generator 30 can be programmed to operate in a pulsed mode or a level mode. In the level mode, each output channel asserts, on a corresponding output line, the state of a corresponding instruction bit of the 8-bit instruction on lines 32 when a match indication signal occurs. The channel then holds that state until a subsequent output instruction causes a state change. In the pulsed mode, each output channel asserts, on a corresponding output line, an output pulse of one timebase interval duration in response to a corresponding set bit of the 8-bit instruction on lines 32 when a match indication signal occurs.

Figure 3A:
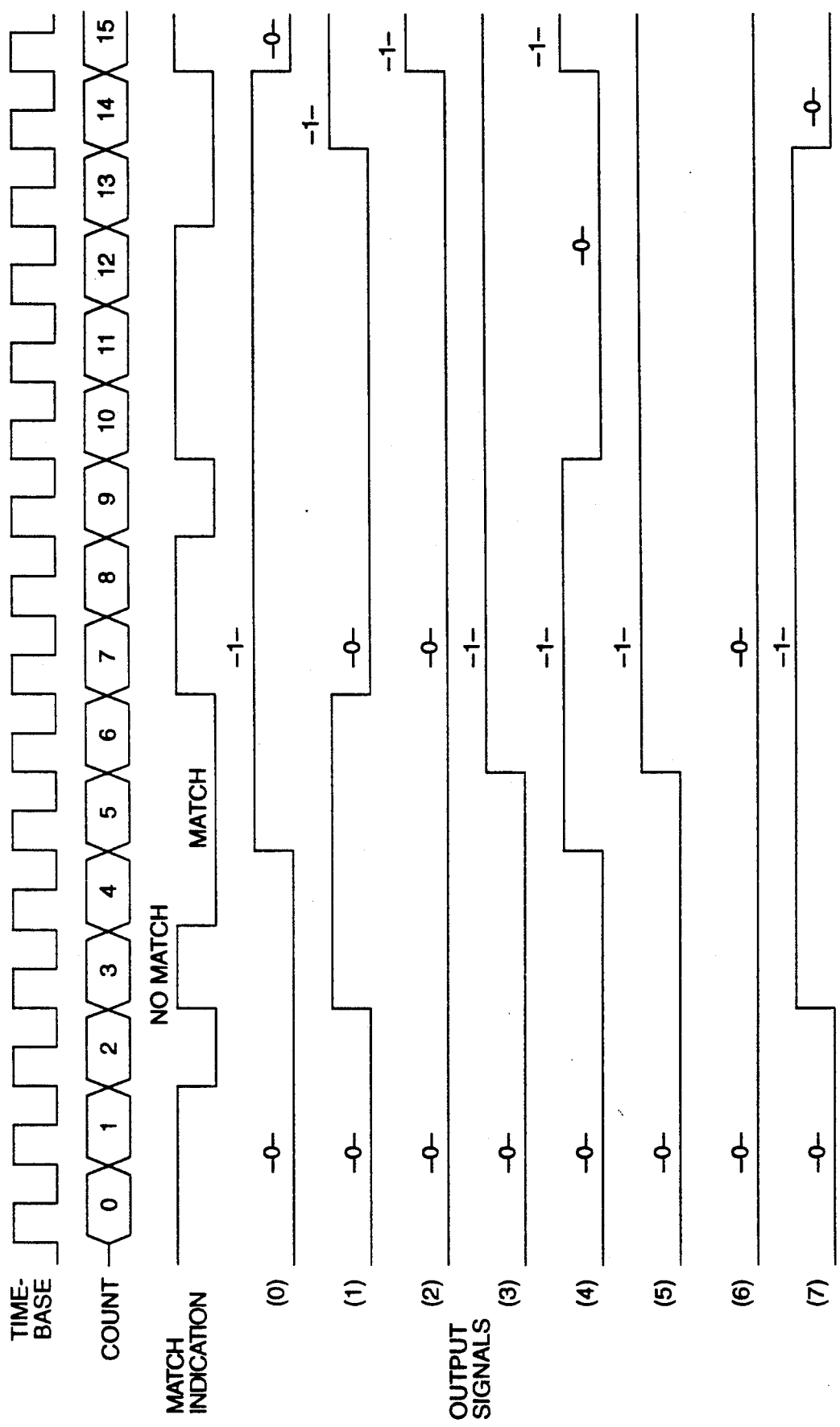
FIGS. 3a and 3b are respective illustrative level and pulsed output signal patterns generated by the pattern generator of the timing system of FIG. 1.

The illustrative timing diagram of FIG. 3a demonstrates the operation of the pattern generation unit 14 in the level mode. The illustrative timing diagram of FIG. 3b demonstrates its operation in the pulsed mode. The output signals of FIG. 3a are generated in response to the series of output/timing instructions in the following Table 1 in which output instructions are represented in base two, and timing instructions are represented in base ten. Initially, in the preferred embodiment, an initialize command issued by a processor causes the pattern generator 30 to initially set all output signals on lines 32 to a predetermined level. In the embodiment described herein, all output signals are set to logical zero.

TABLE 1

| Output Instruction | | | | | | | | Timing |
|---|---|---|---|---|---|---|---|---|
| 0 | 1 | 2 | 3 | 4 | 5 | 6 | 7 | Instruction |
| 0 | 1 | 0 | 0 | 0 | 0 | 0 | 1 | 2 |
| 1 | 1 | 0 | 0 | 1 | 0 | 0 | 1 | 4 |
| 1 | 1 | 0 | 1 | 1 | 1 | 0 | 1 | 5 |
| 1 | 0 | 0 | 1 | 1 | 1 | 0 | 1 | 6 |
| 1 | 0 | 0 | 1 | 0 | 1 | 0 | 1 | 9 |
| 1 | 1 | 0 | 1 | 0 | 1 | 0 | 0 | 13 |
| 0 | 1 | 1 | 1 | 1 | 1 | 0 | 0 | 14 |

Match indication signals are provided on lines 28 upon the occurrences of the counts indicated in Table 1. As shown in FIG. 3a, for example, in response to clock count=6, the pattern generator 30 generates an 8-bit output signal pattern in which each channel asserts a signal having a logical state identical to that of a corresponding bit of the 8-bit output instruction asserted on lines 35 at clock count=6.

Figure 3B:
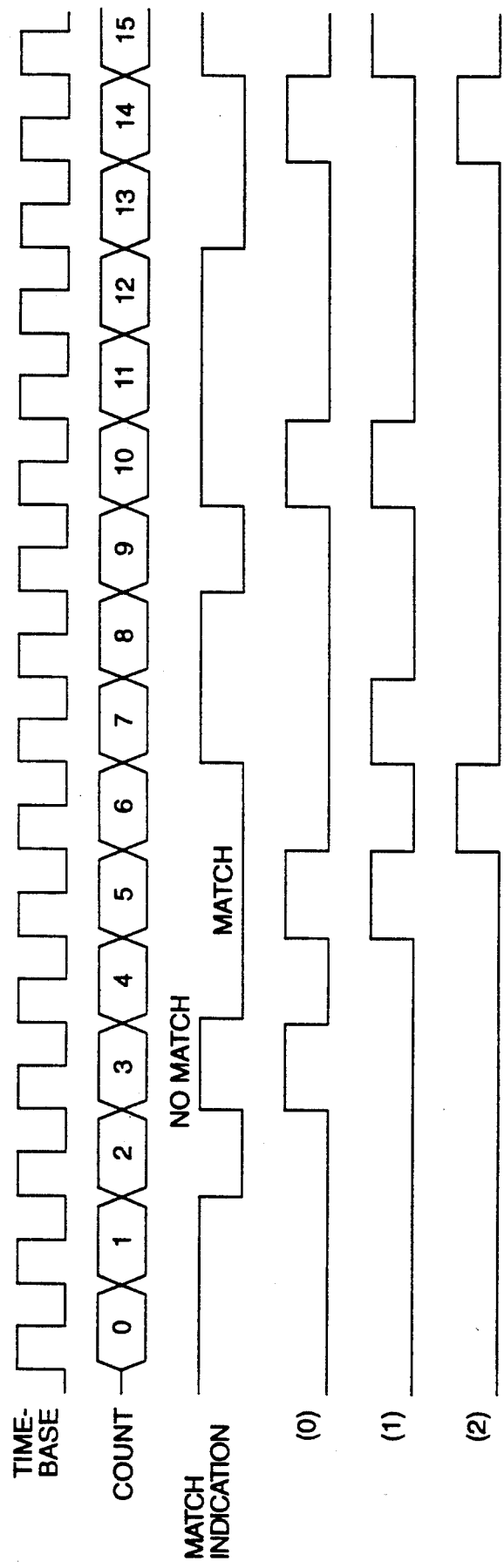

The pulsed mode output signals of FIG. 3b are generated in response to the series of output/timing instructions in the following Table 2 in which output instructions are represented in base two, and timing instructions are represented in base tine. For the sake of simplicity, only three output signal and three output instructions, signals (0-2) and instructions (0-2), are shown in FIG. 3b and Table 2. It will be appreciated that the other five output signals and output instructions behave similarly.

TABLE 2

| Output Instruction | | | Timing |
|---|---|---|---|
| 0 | 1 | 2 | Instruction |
| 1 | 0 | 0 | 2 |
| 1 | 1 | 0 | 4 |
| 0 | 0 | 1 | 5 |
| 0 | 1 | 0 | 6 |
| 1 | 1 | 0 | 9 |
| 1 | 0 | 1 | 13 |
| 0 | 1 | 0 | 14 |

As shown in FIG. 3b, for example, in response to clock count=6, the pattern generator generates an output pulse for output signal (1) measuring only one clock interval in duration.

It will be appreciated, although it is not shown in FIGS. 3a or 3b, that individual channels of the pattern generator can be individually set to level or to pulsed mode.

When the counter 18 resets to zero, the pattern FIFO 22 receives new output/timing instructions on lines 64 if the retransmit signal on line 66 is not set. If, on the other hand, the retransmit signal on line 66 is set, then the pattern FIFO 22 outputs in seriatim the previously loaded sequence of output/timing instructions.

The output timing signal (OTS 6) on line 68 can be configured to provided a stop signal to the counter 18. Similarly, output timing signal (OTS 7) on line 70 can be configured to provide a rewind signal to the counter 18. The use of either of these signals to stop or to rewind the counter advantageously allows local regeneration of an output signal pattern without the need to count through an entire count sequence, i.e., when the retransmit signal is set. They also permit control of the frequency of repetition of the entire output signal pattern series. More specifically, the output signals on lines 68 or 70 (OTS 6, OTS 7) are determined by corresponding bits on lines 35. By appropriately configuring output lines 68 or 70 and providing appropriate output instruction bits on lines 35, the counter 18 can be made to stop or rewind before completing an entire 24-bit count sequence without the need to involve a processor (not shown) of the control/monitoring system.

Thus, through the rewind and start interrupts, a processor of the control/monitoring system 24 can be notified of the status of the counter, i.e., whether it has been stopped, triggered or rewound. This, for example, allows a processor to disable the clock unit 12 from responding to the external system gracefully, between completion of an existing pattern and receipt of a next trigger signal.

Figure 4A:
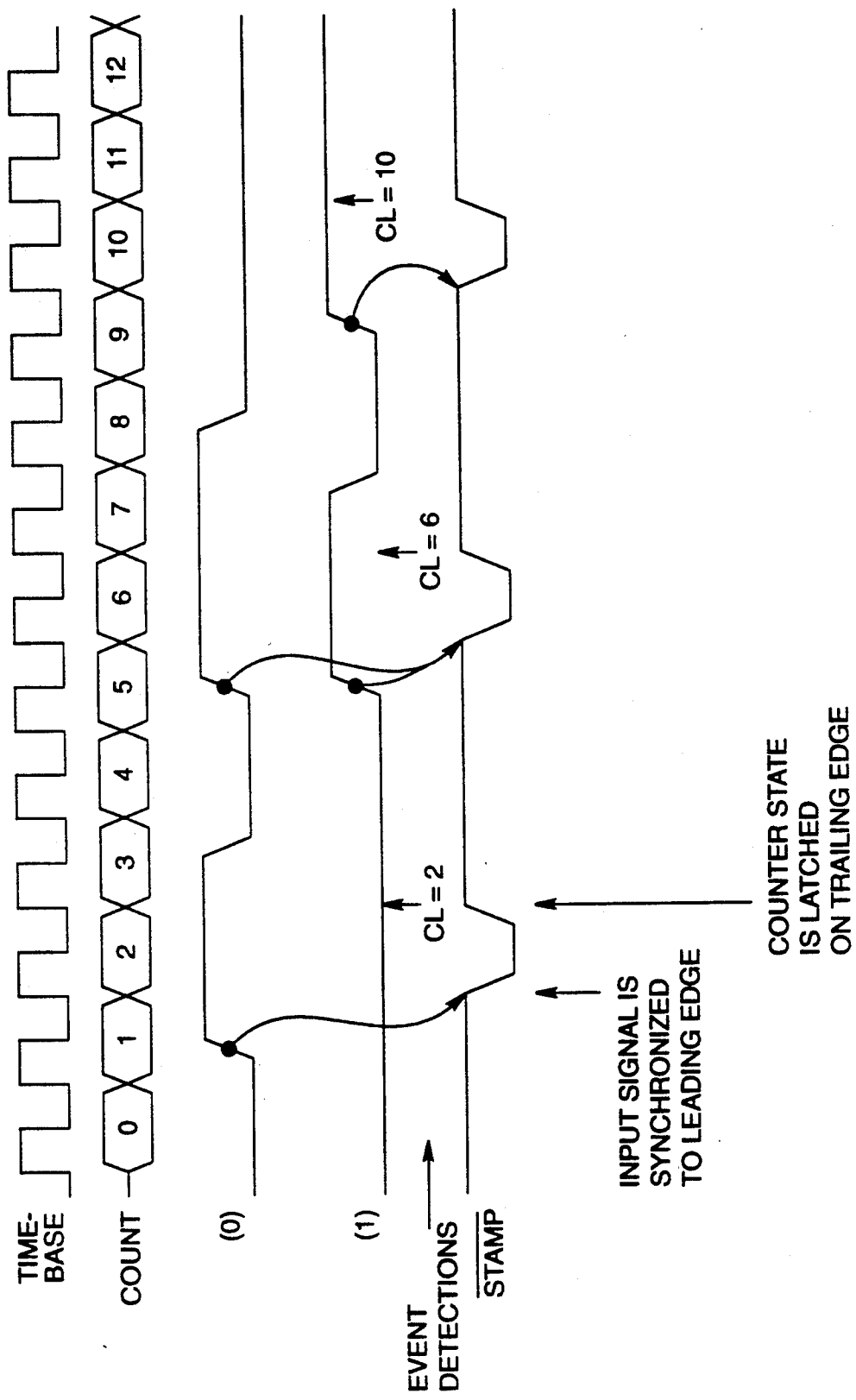
FIG. 4a is an illustrative timing diagram showing the assertions of representative digital trigger signals that can be detected by the event detection circuitry of the timing system of FIG. 1 in which the event detection circuitry is rising edge sensitive.

The detection and reporting unit 16 includes the event detection circuitry 36 that detects assertions of one or more trigger signals on lines 34 and further includes the event FIFO 44 which stores a record of the assertion of the one or more trigger signals. The operation of the detection and reporting unit will be appreciated from the illustrative timing diagrams of FIG. 4a which illustrates the assertion of two trigger signals at times set forth in the following Table 3. It will be appreciated that in the timing diagrams of FIG. 4a, the $\overline{\text{STAMP}}$ is in response to the rising edge of the trigger signals (0) and (1). For example, a trigger signal asserted at time t=1 results in a $\overline{\text{STAMP}}$ signal synchronized to the leading edge of clock counter=2 and results in latching of a counter state of "2" on the trailing edge of clock count=2.

TABLE 3

| Trigger Signal | | | | Count |
|---|---|---|---|---|
| Events | | (States) | | |
| (0) | (1) | (0) | (1) | (Time-Stamp) |
| T | N | 1 | 0 | 2 |
| T | T | 1 | 1 | 6 |
| N | T | 0 | 1 | 10 |

In Tables 3 and 4, T=triggered and N=Not Triggered. In Table 3, the detection of assertions of only two of the eight trigger signals are shown for the sake of simplicity. It should be appreciated that the event detection circuitry 36 is responsive to changes in trigger states (logical 1 to logical 0 or logical 0 to logical 1), and the even signals on lines 40 reflect the values of the trigger signals after such changes. In Tables 3 and 4, T represent that a trigger was detected on the input trigger signal. N represents that no trigger was detected on the input trigger signal.

At time t=5, for example, both a rising edge of trigger signal (0) is asserted, and a rising edge of trigger signal (1) is asserted. In response to this trigger signal event, the event detection circuitry 36 provides a stamp signal on line 42. Moreover, on individual ones of lines 40 corresponding to the individual ones of lines 34 on which the two trigger signals are asserted either the logical state of the input signal at the time a trigger was detected, or a logical level one if a trigger was detected on the input signal, is provided, depending on the configuration of the even detection circuitry 36. In response to the stamp signal, the event FIFO 44 stores the count on line 20 when the detection event was detected, that is clock counter=6, together with the logical one value signals on the individual lines 40 corresponding to the lines on which trigger signals (0) and (1) were asserted. Values for other trigger signals asserted at count=6 also are stored, but for the sake of simplicity, these other signals are not shown.

Figure 4B:
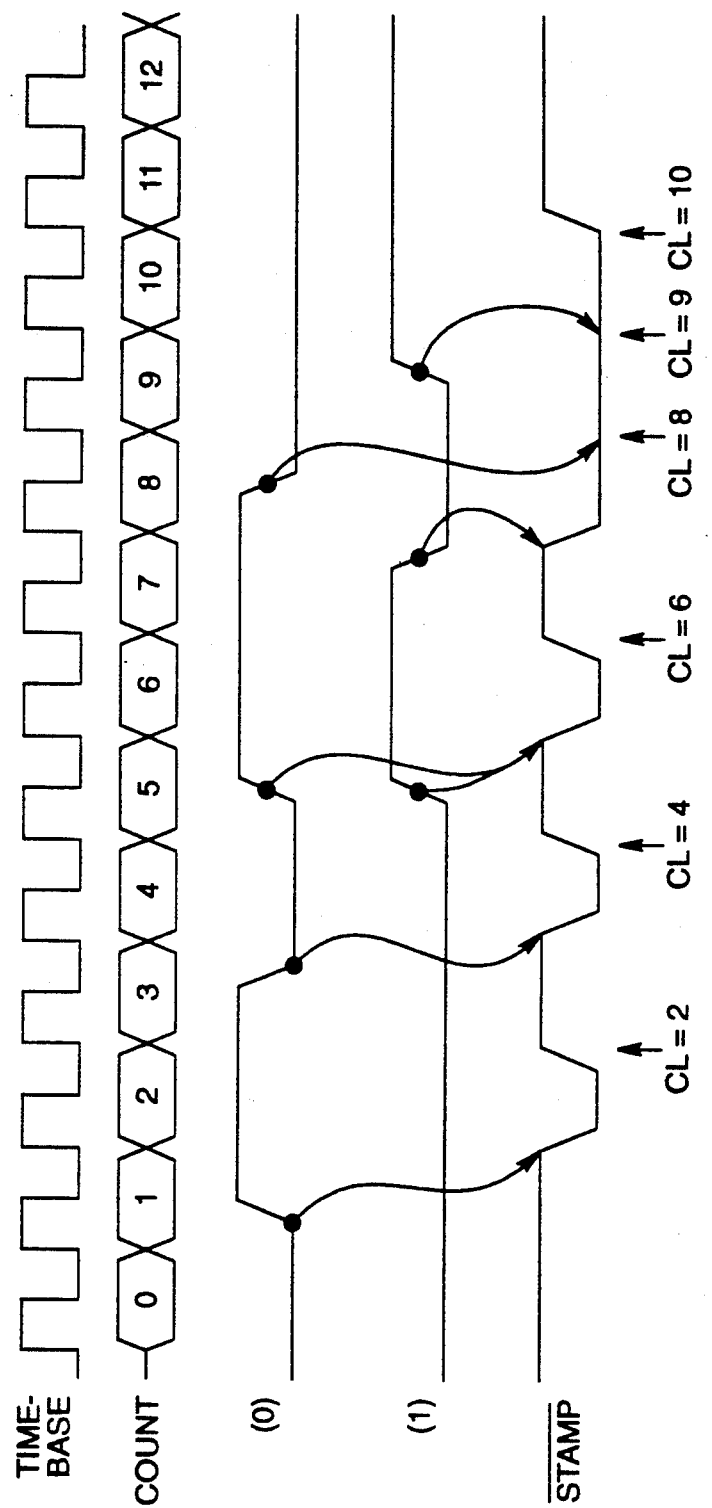
FIG. 4b is an illustrative timing diagram showing the assertion of a representative digital trigger signals that can be detected by the event detection circuitry of the timing system of FIG. 1 in which the event detection circuitry is rising edge sensitive and falling edge sensitive.

Alternatively, for example, the event detection circuitry 36 can be configured to respond to both the rising and the falling edges of the timing signals as illustrated in Table 4 and the timing diagrams of FIG. 4b. Once again, for simplicity only two of the eight event signals are shown.

TABLE 4

| Trigger Signal | | | | Count |
|---|---|---|---|---|
| Events | | (States) | | |
| (0) | (1) | (0) | (1) | (Time-Stamp) |
| T | N | 1 | 0 | 2 |
| T | N | 0 | 0 | 4 |
| T | T | 1 | 1 | 6 |
| N | T | 1 | 0 | 8 |
| T | N | 0 | 0 | 9 |
| N | T | 0 | 1 | 10 |

Figure 5:
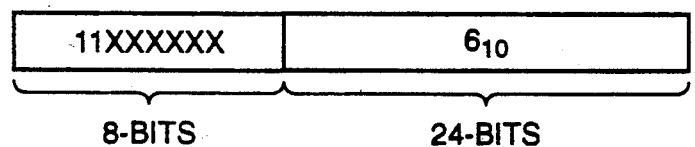
FIG. 5 is a record produced by the event FIFO of the timing system of FIG. 1 in which both trigger signal states and a time-stamp are recorded.

Thus, the event FIFO 44 stores a record of the assertions of the trigger signals. In the preferred embodiment, the record contains 32 bits. 8-bits record which trigger signals were asserted, and 24-bits store the count at the time of the assertions. FIG. 5 illustrates a record of the event at count 5 in FIG. 4b. The X's indicate don't care states.

Figure 6:
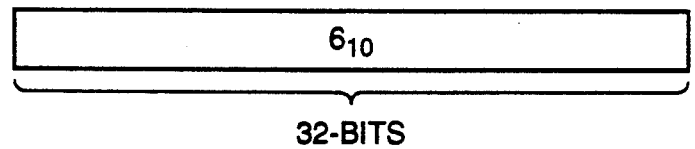
FIG. 6 is a record produced by the event FIFO of the timing system of FIG. 1 in which only a time-stamp is recorded.

Alternatively, the detection and recording unit 16 can be configured to merely provide a record of the time at which a trigger signal was asserted on any of lines 34. In that case, the 32-bit count on lines 20 is stored by the event FIFO 44 in response to a provision of the stamp signal. The stamp signal is produced in response to a single trigger signal on line 34-1 or to any one or more trigger signals on lines 34-2. In such configuration, no record is made of the states of the trigger signals at the time of the event or of which trigger signal caused the count to be recorded FIG. 6 illustrates a record of the event in FIG. 4b at count=5 in which no trigger signal state information is stored.

While one particular embodiment of the invention has been described in detail herein, it will be appreciated that various modifications can be made to the preferred embodiment without departing from the scope of the invention. For example, the blocks and signals shown in the timing system 10 of FIG. 1 are extendable in terms of number of signals and number of bits. The number of output timing signals can be increased or decreased to an arbitrary number with a corresponding increase in the bit-width of the output instruction. The bit-width of the timing instructions can be decreased or increased to not greater than the bit-width of the system counter 18. The system counter can have any bit-width. The same variations are possible in the event detection and recording unit 16.

Figure 7:
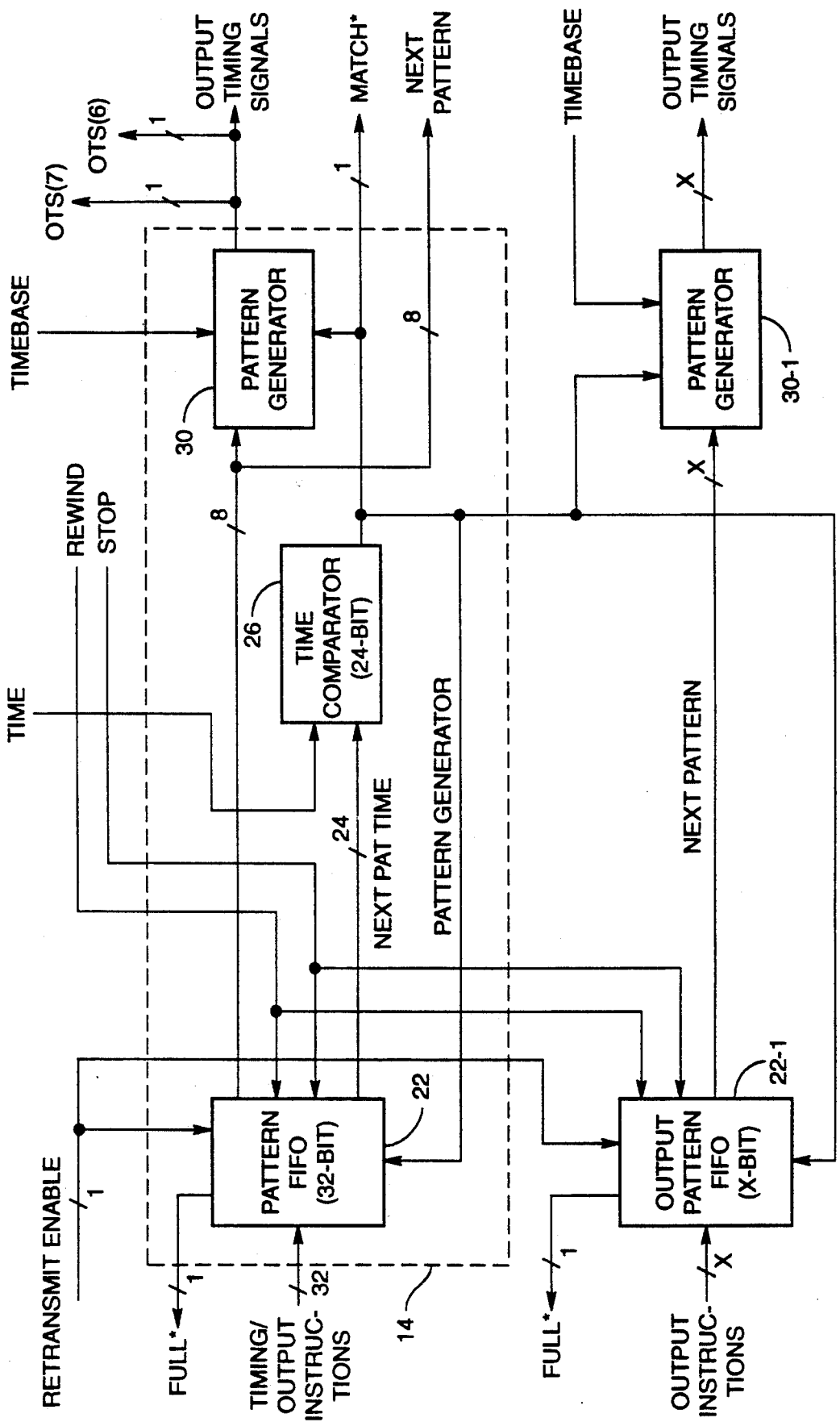
FIG. 7 is a block diagram of a modified portion of the timing system of FIG. 1 having a second output pattern FIFO and pattern generator added thereto.

Referring to FIG. 7, for example, the pattern generation unit 14 is extended by adding a second pattern generator 30-1 and a second pattern FIFO and 22-1. The second pattern FIFO contains output instructions only. The second pattern generator 30-1 uses the stop, rewind, retransmit enable, timebase, and match* I/O signals of the timing system 10.

It should be appreciated that each output channel of the pattern generator 30 need not be limited to only a corresponding single bit of an 8-bit instruction. The instruction for each channel could be several bits in width. Instead of an 8-bit total output instruction, for example, it is possible to have a 16-bit output instruction where 2 bits determine what state each output channel asserts when a match indication occurs. Thus, a possible $2^n$ number of functions could be performed by each output signal as instructed by the corresponding n-bit instruction for that output channel.

Moreover, in addition to a pulse and level mode, a toggle mode could be used in which each output channel changes state in response to a corresponding set bit in the output instruction when a match indication occurs.

Instead of employing the pattern FIFO 22 to store output instructions and timing instructions a randomly accessible read/write memory (not shown) could be employed in which the contents of the FIFO could be modified at any time by processor (not shown) but would still be presented to the pattern generator 30 in some predetermined order.

Figure 8:
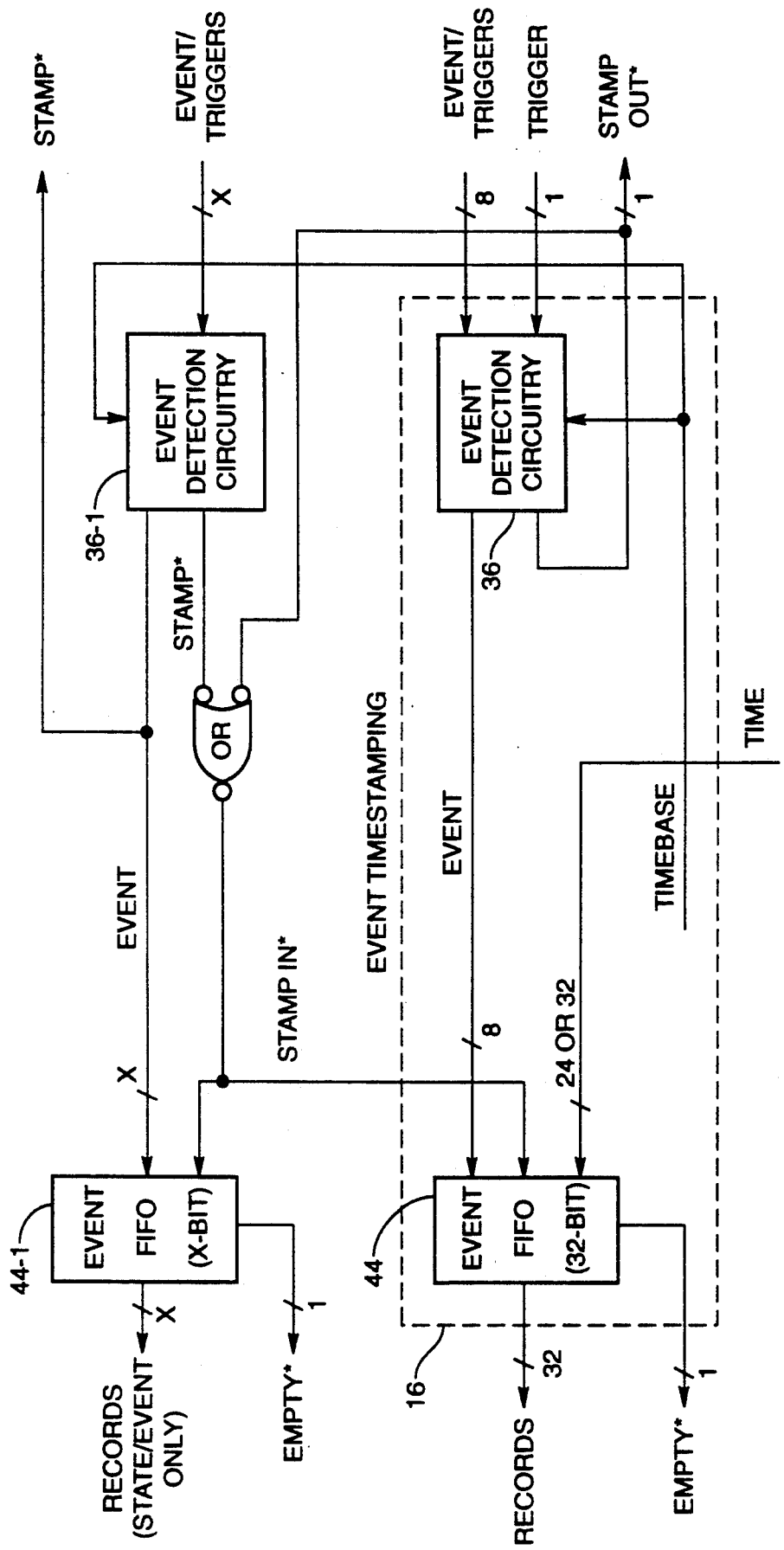
FIG. 8 is a block diagram of a modified portion of the timing system of FIG. 1 having a second event FIFO and event detection circuitry added thereto.

As shown in FIG. 8, the event detection and recording unit 16 is extended by adding a second event detection circuit 36-1 and a second event FIFO 44-1. The stamp* signal is replaced by a stamp out* and stamp in* signals. The stamp out* signal is logically OR'ed with the external event detection circuit stamp* signal to generate the stamp in* signal which notifies both event FIFOs 30, 30-1 when to record events. The second event FIFO stores input trigger information. A time stamp is stored only by the event FIFO labelled 44. The second event detection circuitry 36-1 uses stamp out* and timebase signals of the timing system and generates a stamp in* signal.

Figure 9:
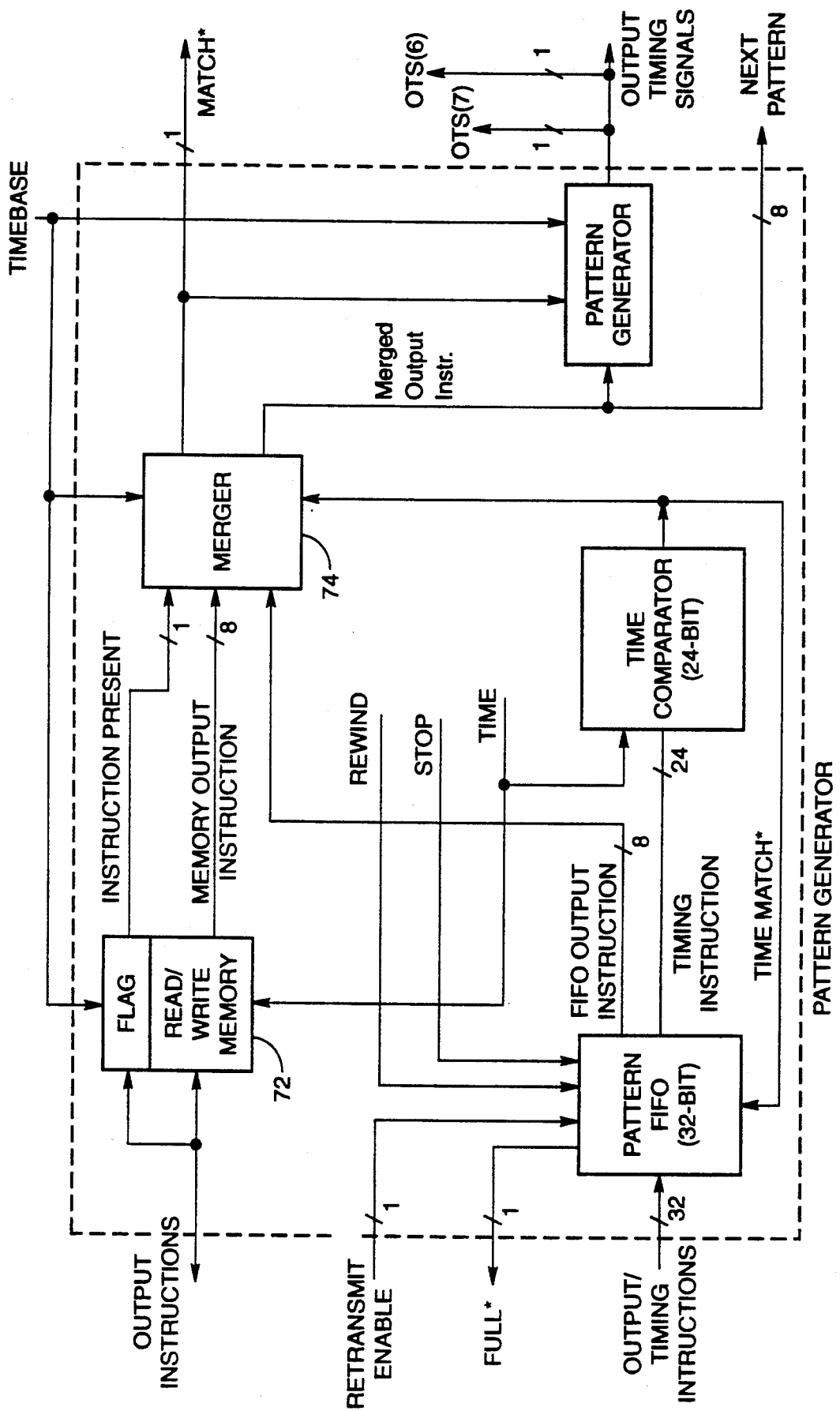
FIG. 9 is a pattern generation unit including a read/write memory and merger circuitry in accordance with the invention.

Referring to FIG. 9, a random access read/write dual-port memory 72 has been added to the pattern generation unit 14 along with an output instruction merger circuit 74. The low order N bits of the system counter addresses the memory at a port of the merger circuit 74. Thus, as the system counter 18 increments, each successive location of the memory 72 is presented to the merger circuit 74 with each timebase clock in a rotating fashion. Each memory location corresponds to the time period modulo N where $2^N$ is the number of memory locations. A flag bit in each memory location is set if an instruction is present in that memory location. The merger circuit 74 monitors both the time match* signal generated by the time comparator 26, and the instruction present flag in the currently selected memory location. If either is true, the merger circuit generates the match* signal. If only time match* is true, the output instruction is copied from the pattern FIFO 22 to the pattern generator 30. If only the instruction present flag is true, the output instruction is copied from the currently selected memory location to the pattern generator 30. If both conditions are true, the merger circuit 74 merges the two output instructions into a new output instruction according to a predetermined algorithm. As each memory location is presented to the merger circuit, the instruction present flag is automatically cleared. A processor of the control/monitoring system 24 can read and write locations in the memory 72 at any time. Whenever an output instruction is written to the memory 72, the instruction present flag is automatically set.

Since the memory 72 stores output instructions that can be inserted into the output pattern stream in the next $2^N$ time periods, adding this memory allows "last minute" modifications of the output instructions and insertion of new timing instructions by a processor.

Alternatively, the memory 72 could alternatively be write-only at the processor port. In addition, two or more instructions written to the same memory location could automatically be merged and saved as a combined instruction.

Figure 10:
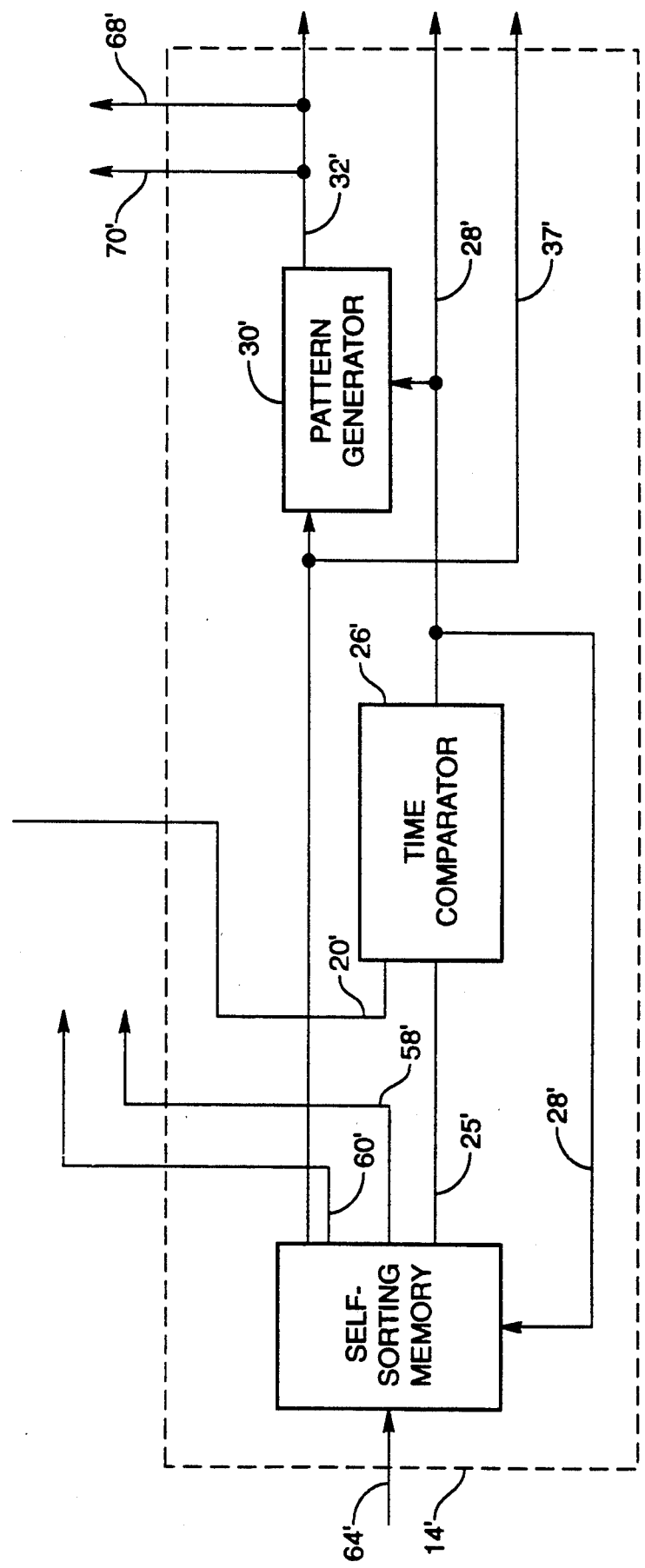
FIG. 10 is a pattern generation unit in accordance with the present invention which includes a self-sorting memory.

Referring to the illustrative drawings of FIG. 10, there is shown a pattern generation unit 14' in which self-sorting memory 76 has been inserted. The self-sorting memory 76 orders sequences of output instructions and corresponding timing instructions according to the value of the timing instructions. Instructions then could be loaded by the control/monitoring system 24 into the self-sorting memory 76 in any order, and the memory would order the instructions such that those with the lowest numeric value of timing instruction greater than the current count would be presented to the pattern generator 30' first. Timing instructions with numeric values less than the count, for example, could be handled in one of two ways: (a) they could be ignored (i.e. not stored in the memory) or (b) they could be stored for use after the count is restarted. It will be appreciated that in FIG. 10, primed reference numerals correspond to previously described components of previously described embodiments.

Alternatively, the counter could be caused to count down instead of up without departing from the invention. A self-sorting memory then could be used in which the instructions were ordered such that those with the highest numeric value of timing instruction less than the current count would be presented to a pattern generator first.

If two or more timing instructions were presented to the self-sorting memory 76 with the same timing instruction value, the memory could merge the corresponding output instructions into a new output instruction using some predetermined algorithm. For example, the two corresponding output instructions could be logically OR'ed together to form a new output instruction. Alternatively, if the self-sorting memory was also readable, its contents could be read and modified by the processor.

This modification is useful, for example, in the situation where more than one processor is accessing the self-sorting memory 76, i.e. more than one processor is generating output timing signals. Each processor could share the self-sorting memory without knowing anything about the timing instructions generated by the other processors. The self-sorting memory properly orders the timing and output instructions from multiple processors as they are loaded.

Also, two types of acknowledgment input signals could be added to the timing system. A general non-ready signal (not shown) could be added which when asserted causes the system counter 18 timing device to stop counting. Once the not-ready signal is unasserted, the timing would resume counting. This would allow an external device to prevent generation of subsequent output patterns until the device was ready. Alternatively, when the not-ready signal is asserted, the system counter 18 could continue counting until a match indication, at which time the system counter would be suspended and the output channels would not be changed until the not-ready signal was unasserted. When the not-ready signal is unasserted the output channel signals are changed and the system counter continues counting. This would allow external devices to pace the changing of the output signals as needed.

Furthermore, each output channel could have a corresponding not-ready signal. When this signal was asserted, the system counter 18 could suspend counting when a match indication occurred along with the corresponding output instruction for that channel being set (or changing state) indicating that the output timing signal for that output channel is about to change state. The system counter would resume counting and change the output channel state when the channel specific not-ready signal is unasserted. This would allow external devices to pace the changing of a specific output channel while allowing patterns that do not affect the state of that channel to proceed.

Additional alternative embodiments to the invention can be provided. For example, a timing system could be constructed in which the timing count sequence counted down rather than counting up. The foregoing description is not intended to limit the invention which is defined in the appended claims in which:

What is claimed is:

1. A timing apparatus for use in conjunction with a control system comprising:

a counter generating a sequence of clock counts;

a pattern memory storing a multiplicity of output/timing instructions, each output/timing instruction including a first output portion for controlling an external system and a corresponding timing portion corresponding to one of said clock counts, said pattern memory outputting said output/timing instructions one at a time;

a comparator coupled to said pattern memory to receive one at a time said timing portion of each output/timing instruction outputted by said pattern memory, said comparator coupled to said counter to receive said sequence of clock counts, said comparator comparing said timing portion of each one of said outputted output/timing instructions with said sequence of clock counts, said comparator generating a match indication signal upon occurrence of a match between said timing portion of a respective one of said outputted output/timing instructions and a corresponding one of said clock counts;

wherein said pattern memory is coupled to said comparator to receive said match indication signal, said pattern memory outputting a next one of said output/timing instructions in response to receiving said match indication signal, said timing portion of said next one of said output/timing instructions corresponding to a subsequent one of said clock counts occurring after said corresponding one of said clock counts; and a read/write memory coupled to said counter to receive said sequence of clock counts, said read/write memory storing a multiplicity of last minute output instructions, each last minute output instruction including a second output portion for controlling said external system and being stored at an address in said read/write memory corresponding to one of said clock counts, said read/write memory outputting a respective one of said last minute output instructions when a respective clock count correspond to said address in said read/write memory at which said respective one of said last minute output instructions is stored.

2. The apparatus of claim 1 wherein:
said pattern memory comprises a FIFO memory; and
said output/timing instructions are stored in said FIFO memory in the order in which said output/timing instructions are to be outputted by said FIFO memory.

3. The timing apparatus of claim 1 wherein:
said pattern memory comprises a self-sorting memory;
said output/timing instructions are stored in any order in said self-sorting memory.

4. The timing apparatus of claim 1 wherein said control system is a control/monitoring system, said timing apparatus further comprising:
an event detection circuit detecting an event trigger signal from said external system and producing a stamp signal in response to detection of said event trigger signal; and
an event memory coupled to said event detection circuit and said counter, said event memory storing an event record in response to receiving said stamp signal, said even record including said event trigger signal and a respective clock count corresponding to when said stamp signal was received by said event memory, said even memory outputting said event record for monitoring by said control/monitoring system.

5. The timing apparatus of claim 1, wherein:
said read/memory stores for each last minute output instruction stored in said read/write memory a corresponding instruction present flag;
said timing apparatus further comprises a merger circuit coupled to said pattern memory to receive said first output portion of said respective one of said output/timing instructions, coupled to said comparator to receive said match indication signal, and coupled to said read/write memory to receive said second output portion of said respective one of said last minute output instructions and to receive said corresponding instruction present flag, said merger circuit generating an output signal corresponding to (A) said received first output portion of said respective one of said output/timing instructions when said merger circuit receives said match indication signal but not said instruction present flag, (B) said received second output portion of said respective one of said last minute output instructions when said merger circuit receives said instruction present flag but not said match indication signal, and (C) a signal based on said second and first output portions of said respective last minute output instruction and said respective output/timing instruction when both said instruction present flag and said match indication signal are received by said merger circuit.

6. The timing apparatus of claim 5, wherein:
said output signal generated by said merger circuit when both said instruction present flag and said match indication signal are received by said merger circuit comprises a merged output signal generated by said merger circuit from said second and first output portions of said respective last minute output instruction and said respective output/timing instruction in accordance with predefined criteria.

7. The timing apparatus of claim 5, further comprising a pattern generator coupled to said merger circuit, said pattern generator generating a patterned output signal in response to said output signal from said merger circuit.

8. A method for use in conjunction with a control system comprising the steps of:
generating a sequence of clock counts;
storing a multiplicity of output/timing instructions, each output/timing instruction including a first output portion for controlling an external system and a corresponding timing portion corresponding to one of said clock counts;
outputting said output/timing instructions one at a time;
comparing said timing portion of each of said output/timing instructions outputted one at a time with said sequence of clock counts;
generating a match indication signal upon occurrence of a match between said timing portion of a respective one of said output/timing instructions and a corresponding one of said clock counts; and
outputting in response to receiving said match indication signal a next one of said output/timing instructions, said timing portion of said next one of said output/timing instructions corresponding to a subsequent one of said clock counts occurring after said corresponding one of said clock counts;
storing a multiplicity of last minute output instructions, each last minute output instruction including a second output portion for controlling said external system and being stored at an address in said read/write memory corresponding to one of said clock counts; and
outputting a respective one of said last minute output instructions when a respective clock count corresponds to said address in said read/write memory at which said respective one of said last minute output instructions is stored.

9. The method of claim 8 wherein said control system is a control/monitoring system, said method further comprising the steps of:
detecting an event trigger signal from said external system;
producing a stamp signal in response to detection of said event trigger signal; and
storing an event record in response to receiving said stamp signal, said event record including said event trigger signal and a respective clock count corresponding to when said stamp signal was received, said event record for monitoring by said control/monitoring system.

10. The method of claim 8 further comprising the steps of:
  storing an instruction present flag for each stored last minute output instruction;
  outputting a corresponding instruction present flag with said respective last minute output instruction;
  generating an first output signal corresponding to said first output portion of said respective one of said output/timing instructions in response to receiving said match indication signal but not said instruction present flag;
  generating an second output signal corresponding to said second output portion of said respective one of said last minute output instructions in response to receiving said instruction present flag but not said match indication signal; and
  generating an third output signal based on said second and first output portions of said respective last minute output instruction and said respective output/timing instruction in accordance with predefined criteria in response to receiving both said instruction present flag and said match indication signal.

11. The method of claim 10, wherein said step of generating said third output signal in response to receiving both said instruction present flag and said match indication signal comprises generating an merged output signal by merging said second and third output portions of said respective last minute output instruction and said respective output/timing instruction in accordance with said predefined criteria.

* * * * *